United States Patent [19]

Powers et al.

[11] Patent Number: 5,489,133
[45] Date of Patent: Feb. 6, 1996

[54] ATTACHMENT BRACKET

[75] Inventors: James Powers, Richmond, Va.; Lydia Demski, St. Joseph, Mich.

[73] Assignee: Scope Services, Inc., St. Joseph, Mich.

[21] Appl. No.: 404,551

[22] Filed: Mar. 15, 1995

Related U.S. Application Data

[62] Division of Ser. No. 235,707, Apr. 29, 1994, Pat. No. 5,456,532.

[51] Int. Cl.$^6$ ............................. G21C 19/00; B66C 1/00
[52] U.S. Cl. ............................. 294/81.6; 294/90; 376/284
[58] Field of Search ................................. 376/284, 277, 376/260; 294/81.6, 81.62, 86.4, 90; 414/146; 62/67, 68, 75, 137, 344; 366/110, 114

[56] References Cited

U.S. PATENT DOCUMENTS

| | | | |
|---|---|---|---|
| 190,487 | 5/1877 | Gregory | 294/81.6 |
| 1,027,335 | 5/1912 | Heyerdahl | 294/81.6 |
| 1,774,623 | 9/1930 | Williams | 294/81.6 |
| 3,278,218 | 10/1966 | Lebre | 294/81.6 |
| 3,409,156 | 11/1968 | Mills | 294/81.6 |
| 3,844,885 | 10/1974 | Weems et al. | 376/284 |
| 3,850,002 | 11/1974 | Field | 376/284 |
| 4,659,068 | 4/1987 | Meuschke | 376/284 |
| 4,671,920 | 6/1987 | Scrabis et al. | 376/284 |
| 4,711,755 | 12/1987 | Scrabis et al. | 376/260 |
| 4,723,611 | 2/1988 | Scrabis et al. | 376/284 |
| 5,161,845 | 11/1992 | Carpenter, Jr. | 294/90 |

*Primary Examiner*—Daniel D. Wasil
*Attorney, Agent, or Firm*—Popham, Haik, Schnobrich & Kaufman, Ltd.

[57] ABSTRACT

A bracket for attaching at least one vibrator to an ice basket of a pressurized water reactor includes a horizontally extending first armature portion and a horizontally extending second armature portion pivotably attached to the second armature portion. The first and second armature portions have clamps extending downwardly from each of their ends, and each of the clamps includes an arcuate groove extending vertically upwardly from its bottom surface to engage the rim of the ice basket. An attachment portion extends vertically upwardly from and is formed unitarily with the first armature portion, the vibrators being attached to the sides of the attachment portion. The clamps extending from the second armature portion are pivotably connected to and are also laterally adjustable with respect to the first and second ends of the second armature portion.

6 Claims, 2 Drawing Sheets

ATTACHMENT BRACKET

This application is a divisional of U.S. patent application Ser. No. 08/235,707, filed Apr. 29, 1994 now U.S. Pat. No. 5,456,532.

BACKGROUND OF THE INVENTION

1. Field of the Invention

The present invention relates to ice condensers for pressurized water nuclear reactors and to methods of maintaining the ice in such ice condensers. More specifically, the invention relates to a vibrating assembly for vibrating the ice baskets of an ice condenser of a pressurized water reactor, and to a method of maintaining the ice in the ice baskets using such a vibrating assembly.

2. Related Art

There are two types of nuclear reactors generally used in the United States, the boiling water reactor and the pressurized water reactor. In commercial nuclear plants, the reactor is housed in a building called a containment structure. In a catastrophic accident in which one of the pipes attached to the reactor breaks, the contents of the pipe are released into the containment structure.

In boiling water reactors, steam released in the event of a catastrophic accident fills the containment structure and then is forced into a pool of water, so as to suppress the steam and reduce the pressure in the containment structure.

In pressurized water reactors, the reactor is housed in a large "dry" containment structure. The size and strength of the containment holds the steam in the event of an accident. However, in one version of a pressurized water reactor, a suppression system is included to condense steam released during an accident. This suppression system is known as an ice condenser, and was developed by Westinghouse Electric Corporation. An early example of such a suppression system is the subject of U.S. Pat. No. 3,580,806 to Weems et al and assigned to Westinghouse.

In the ice condenser suppression system, fragmented ice is maintained in baskets located in the containment structure. In the event of an accident, the steam released from a broken pipe is channeled into the ice baskets to reduce the pressure in the containment and prevent the release of radioactive steam outside the containment.

Due to melting and sublimation, voids tend to form in the body of fragmented ice, and pieces of fragmented ice may become fused together. In order to minimize these problems, Weems et al propose a system for reducing the thermal gradients, and in turn the convection currents to which the ice fragments are exposed. However, even with such a system, melting and sublimation cannot be eliminated. Consequently, the prior art has developed a number of systems for maintaining the bodies of fragmented ice. U.S. Pat. Nos. 3,850,002; 4,659,068; 4,671,920; 4,711,755; and 4,723,611 are illustrative of such systems. These systems tend to be mechanically complicated, and to be directed to recharging or replenishing the supply of ice, rather that maintaining the ice in optimum condition so as to delay the need for recharging.

It is to the solution of these and other problems to which the present invention is directed.

SUMMARY OF THE INVENTION

It is therefore a primary object of the invention to provide a system for freeing the ice in the ice baskets of an ice condenser suppression system, thereby maintaining the ice in optimum condition and making it more effective.

It is another object of the invention to provide a method for maintaining the ice in the ice baskets of an ice condenser suppression system which employs vibration to free the ice in the ice baskets.

These and other objects of the invention are achieved by providing a vibrating assembly for vibrating an ice basket of a pressurized water reactor which comprises first and second vibrators and a bracket operatively connected to the vibrators. The bracket includes a horizontally extending first armature portion and a horizontally extending second armature portion pivotably attached at its center to the bottom center of the second armature portion. The first armature portion has first and second clamps extending downwardly from its first and second ends, respectively, while the second armature portion has third and fourth clamps extending downwardly from its first and second ends, respectively. Each of the clamps includes a groove extending vertically upwardly from its bottom surface.

The bracket further includes an attachment portion extending vertically upwardly from the first armature portion, the vibrators being attached to the sides of the attachment portion. In one aspect of the invention, the attachment portion is unitarily formed in a single, generally T-shaped piece with the first armature portion. Further, the bracket is smoothly rounded where the attachment portion joins the first armature portion, thereby distributing concentrated forces due to vibrations where the bracket and the first armature portion join.

In another aspect of the invention, the third and fourth clamps are pivotably connected to the first and second ends, respectively, of the second armature portion; and are also laterally adjustable with respect to the first and second ends of the second armature portion towards and away from the middle of the second armature portion.

In still another aspect of the invention, the grooves formed in the clamps are arcuate, having a radius matching the curvature of the rim or top ring of the ice basket.

In the method in accordance with the invention, the vibrator assembly is attached to the rim or top ring of the ice basket by adjusting the positions of the third and fourth clamps to fit the rim and then securing the rim in the first, second, third, and fourth clamps. The vibrators are then activated to free the ice in the ice basket. While the vibrators are activated, the ice basket is pulled from above by exerting an upward force on the bracket and is pushed from below to exert a combination of tension and compression on the ice basket.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
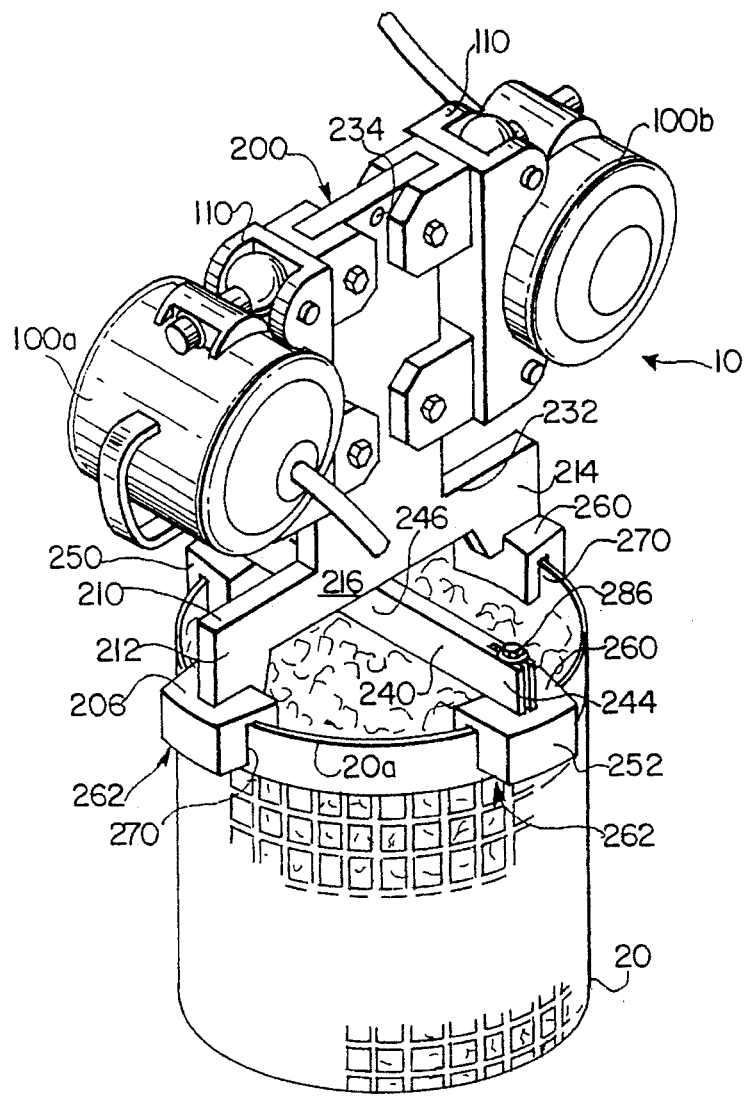
FIG. 1 is a perspective view of an attachment bracket in accordance with the present invention, as secured to an ice basket in use.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 2:
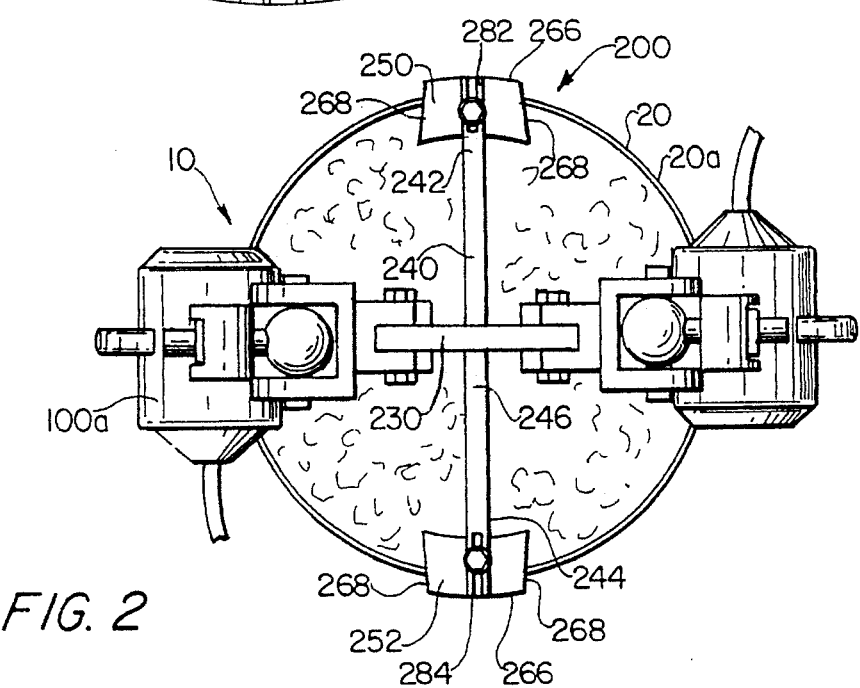
FIG. 2 is a top plan view of the assembly of FIG. 1.
Figures 3, 4:
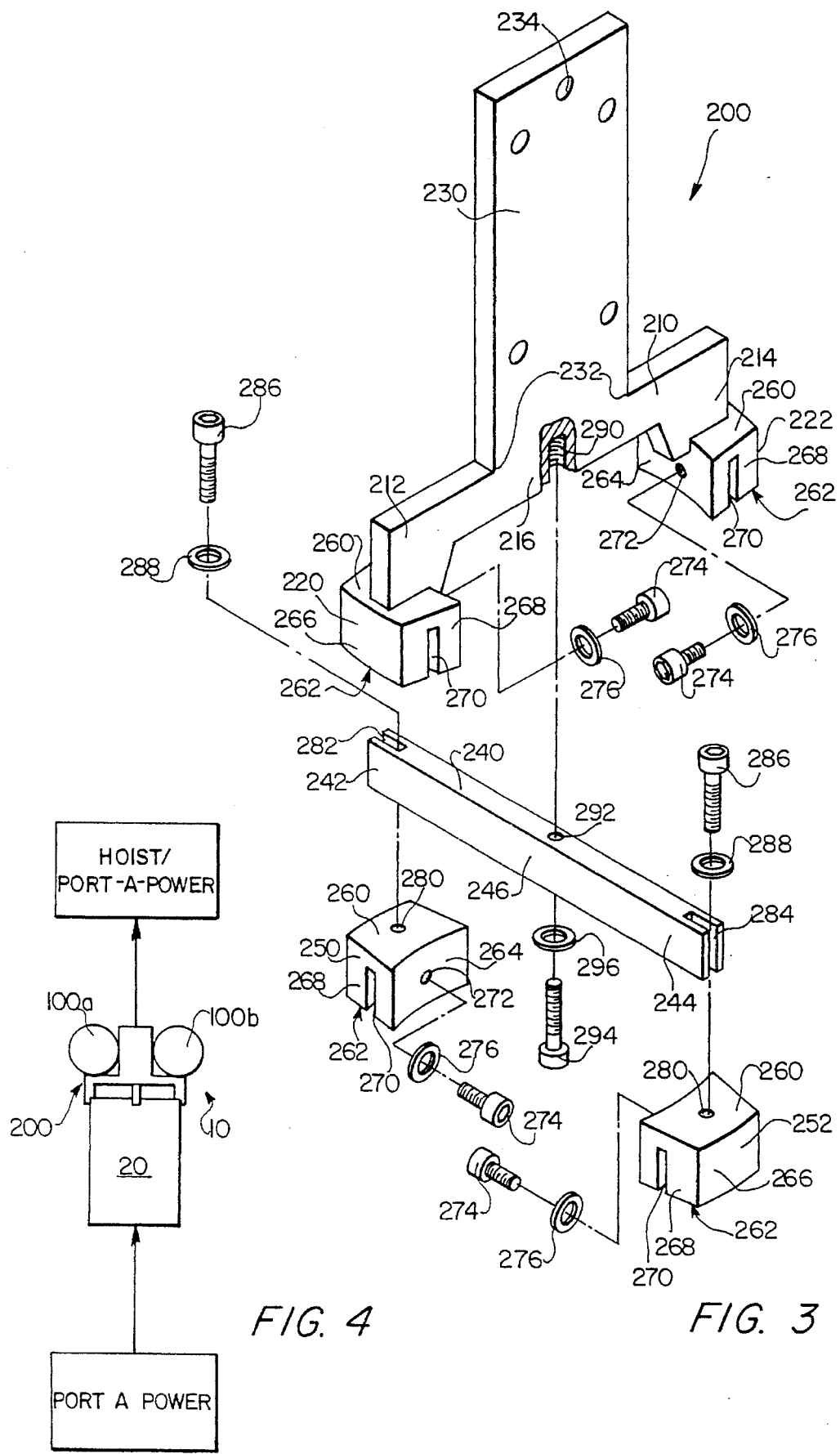
FIG. 3 is an exploded perspective view of the bracket of the vibrating assembly.
FIG. 4 is a diagrammatic representation of the vibrating assembly of FIG. 1 secured to an ice basket, with the ice basket being pulled from the top and pushed from the bottom in accordance with the method of the invention.

Referring now to FIGS. 1–3, there is shown a vibrating assembly 10 in accordance with the present invention for vibrating an ice basket 20 of a pressurized water reactor (not shown). Vibrating assembly 10 comprises left and right vibrators 100a and 100b and a bracket 200 for operatively connecting vibrators 100a and 100b to the rim or top ring 20a of an ice basket 20.

Bracket 200 includes a horizontally-extending first armature portion 210 having first and second downwardly-extending ends 212 and 214 and a middle 216 intermediate first and second ends 212 and 214. First and second clamps 220 and 222 extend downwardly from first armature portion 210 at first and second ends 212 and 214. First and second clamps 220 and 222 are welded or otherwise fixed at notches cut out of first and second ends 212 and 214, respectively.

An attachment portion 230 extends vertically upwardly from first armature portion 210. Attachment portion 230 is unitarily formed in a single, generally T-shaped piece with first armature portion. 210. Preferably, first armature portion 210 and attachment portion 230 are formed from a ¾" thick piece of metal plate. Junctions 232 between attachment portion 230 and first armature portion 210 are smoothly rounded to distribute forces concentrating at junctions 232 due to vibrations. A hole 234 is drilled proximate the top center of attachment portion 230 to accommodate a lifting shackle (not shown) used in placement and removal of assembly 10.

Bracket 200 further includes a horizontally-extending second armature portion 240 pivotably connected to the bottom of a first armature portion 210. Second armature portion 240 has first and second outwardly-extending ends 242 and 244 and a middle 246 intermediate first and second ends 242 and 244. Third and fourth clamps 250 and 252 extend downwardly from second armature portion 240 at first and second ends 242 and 244, respectively. Third and fourth clamps 250 and 252 are pivotably connected to first and second ends 242 and 244 in a manner to be described in detail hereinafter.

Each of first and second clamps 220 and 222 and third and fourth clamps 250 and 252 has top and bottom surfaces 260 and 262, inner and outer surfaces 262 and 264, and opposed end surfaces 268. A groove 270 extends vertically upwardly from each bottom surface 262 and across each of clamps 220, 222, 250, and 252 from one to the other of end surfaces 268. Grooves 270 are arcuate, having a radius matching the curvature of rim 20a of ice basket 20.

An internally-threaded cylindrical bore 272 extends inwardly from each inner surface 264 so as to be in communication with each groove 270. A socket head cap screw 274 or similar fastener is inserted into each bore 272 With a locking washer 276 interposed between its head and inner surface 264 in a conventional manner to secure rim 20a in groove 270 in the same manner as a set screw. As will be appreciated by those of ordinary skill in the art, bore 272 can equally well extend from outer surface 266 into communication with groove 270.

The manner in which third and fourth clamps 250 and 252 are connected to second armature portion 240 will now be described. First and second ends 242 and 244 of second armature portion 240 are provided with first and second vertically-extending slots, respectively. Socket head cap screws 286 or similar fasteners are inserted through slots 282 and 284 and into bores 280 of third and fourth clamps 250 and 252, with locking washers 288 conventionally interposed between the screw heads and top surfaces 260 of third and fourth clamps 250 and 252. The lateral positions of screws 286 in first and second slots 282 and 284 are adjustable. The angular position of grooves 270 of third and fourth clamps 250 and 252 with respect to the longitudinal axis of second armature portion 240 are also adjustable by pivoting third and fourth clamps 250 and 252 relative to the longitudinal axis of second armature portion 240 before tightening screws 286.

In order to connect second armature portion 240 to first armature portion 210, first armature portion 210 is provided with an internally-threaded bore 290 extending upwardly at its center bottom, while second armature portion 240 is provided with a bore 292 through its center. With bores 290 and 292 aligned, a socket head cap screw 294 or similar fastener is inserted through bores 292 and 290 to pivotally connect first and second armature portions 290 and 292 at their respective middles 216 and 246. Again, a locking nut 296 is conventionally interposed between the screw head and the bottom of second armature portion 240.

Preferably, left and right vibrators 100a and 100b are air powered vibrators such as CCR 5500 Martin Vibrotor™ vibrators, and attachment portion 230 is approximately 5" wide by 12" high to accommodate the mounts 110, such as Cradle lug clamp mounts (part no. 22817) required to clamp vibrators 100a and 100b to the sides of attachment portion 230. Vibrators 100a and 100b and their mounts 110 are bolted on each side of attachment portion 230 in the vertical position. This arrangement provides counter rotation of vibrators 100a and 100b and enhances the vibrating efficiency. When in operation, the vibrating forces are directed down along the sides of ice basket 20.

Also preferably, plant air at 60–80 psig is utilized with two air separator-dryers (not shown) to operate vibrators 100a and 100b, producing a total output of approximately 25 CFM. Although this arrangement has proven successful in experimental trials, increasing the total output to 30–50 CFM is also contemplated. It is hypothesized that the additional air supply would increase the vibrating forces transferred to each ice basket 20 and therefore shorten the time interval required to vibrate each ice basket.

In use, as indicated above, a lifting shackle (not shown) is attached to attachment portion 230 through hole 234 in order to position vibrating assembly 210 over the top of a selected ice basket 20. Once vibrating assembly 10 is properly oriented with rim 20a of ice basket 20 properly seated within grooves 270, cap screws 274 are tightened to secure vibrating assembly 10 to ice basket 20. Screw 294 fastening second armature portion 240 to first armature portion 210, and screws 286 fastening clamps 250 and 252 to second armature portion 240 are then tightened to complete the installation of vibrating assembly 10. Once all of the screws have been checked for tightness, the air supply can be turned on to start vibrators 100a and 100b.

Referring now to FIG. 4, in order to optimize the vibrating capabilities of vibrators 100a and 100b, ice basket 20 is pulled from the top utilizing either an overhead hoist or a Port-a-Power™ attached to a fabricated A-frame, depending on the overhead clearance available. Both methods utilize a load cell and the maximum tension is maintained at less than or equal to 3000 pounds pressure. Ice basket 20 also is pushed from the bottom utilizing a Port-a-Power™ with a load cell to maintain a compression of less than or equal to 4000 pounds pressure. The combination of tension and compression during the vibrating maximizes the vibrations along the surfaces of ice basket 20.

Modifications and variations of the above-described embodiments of the present invention are possible, as appreciated by those skilled in the art in light of the above teachings. For example, hold down clamps may be used in certain situations to fit over ends 212, 214, 242, and 244 and to extend through the basket 20 below the top ring to prevent the assembly 10 from pulling off of the top ring.

It is therefore to be understood that, within the scope of the appended claims and their equivalents, the invention may be practiced otherwise than as specifically described.

What is claimed is:

1. A bracket for attaching at least one vibrator to an ice basket of a pressurized water reactor, comprising:

a horizontally extending first armature portion having first and second ends and a middle intermediate said first and second ends;

first and second clamps extending downwardly from said first armature portion at said first and second ends thereof, respectively, said first and second clamps each having a bottom surface and including an arcuate groove extending vertically upwardly from said bottom surface;

a horizontally extending second armature portion having first and second ends and a middle intermediate said first and second ends, said second armature portion being pivotably connected to said first armature portions at said middles thereof; and third and fourth clamps extending downwardly from and pivotably connected to said second armature portion at said first and second ends thereof, respectively, said third and fourth clamps each having a bottom surface and including an arcuate groove extending vertically upwardly from said bottom surface.

2. The bracket of claim 1, further comprising an attachment portion extending vertically upwardly from said first armature portion, said at least one vibrator being attached to said bracket at said attachment portion.

3. The bracket of claim 2, wherein said attachment portion is unitarily formed in a single, generally T-shaped piece with said first armature portion.

4. The bracket of claim 3, wherein said bracket is smoothly rounded where said attachment portion joins said first armature portion, thereby distributing concentrated forces due to vibrations where said bracket and said first armature portion join.

5. The bracket of claim 1, wherein said third and fourth clamps are laterally adjustable with respect to said first and second ends of said second armature portion towards and away from said middle of said second armature portion.

6. The bracket of claim 1, wherein the ice basket has a rim having a curvature, and wherein said grooves are arcuate, having a radius matching the curvature of the rim of the ice basket.

* * * * *